United States Patent
Barai et al.

(10) Patent No.: US 12,537,870 B2
(45) Date of Patent: Jan. 27, 2026

(54) DYNAMIC SESSION REBALANCING ACROSS USER PLANE FUNCTION NODES

(71) Applicant: Cisco Technology, Inc., San Jose, CA (US)

(72) Inventors: Swapnil Barai, Maharashtra (IN); Suyog Subhash Belsare, Maharashtra (IN); Bhavin Desai, Maharashtra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 79 days.

(21) Appl. No.: 18/545,053

(22) Filed: Dec. 19, 2023

(65) Prior Publication Data

US 2025/0202972 A1 Jun. 19, 2025

(51) Int. Cl.
G06F 15/173 (2006.01)
H04L 67/1008 (2022.01)
H04L 67/1012 (2022.01)
H04L 67/1027 (2022.01)

(52) U.S. Cl.
CPC ...... *H04L 67/1008* (2013.01); *H04L 67/1012* (2013.01); *H04L 67/1027* (2013.01)

(58) Field of Classification Search
None
See application file for complete search history.

(56) References Cited

U.S. PATENT DOCUMENTS

| | | |
|---|---|---|
| 2021/0045091 A1 | 2/2021 | Arora et al. |
| 2022/0171663 A1* | 6/2022 | Hiregoudar ........... G06F 3/0631 |
| 2022/0278906 A1 | 9/2022 | Akman et al. |
| 2023/0156522 A1 | 5/2023 | Bashir et al. |
| 2023/0246900 A1* | 8/2023 | Zhang .................. H04L 41/342 709/223 |
| 2023/0261952 A1* | 8/2023 | Chamarthi .......... H04L 41/5051 709/221 |

FOREIGN PATENT DOCUMENTS

WO 2023204814 A1 10/2023

OTHER PUBLICATIONS

3GPP, "Interface between the Control Plane and the User Plane nodes," LTE; 5G; (3GPP TS 29.244 version 16.5.0 Release 16), ETSI TS 129 244 V16.5.0, Technical Specification, Nov. 2020, 317 pages.

* cited by examiner

*Primary Examiner* — Wing F Chan
*Assistant Examiner* — Andrew Woo
(74) *Attorney, Agent, or Firm* — Edell, Shapiro & Finnan, LLC (57) ABSTRACT

A method to address imbalance across User Plane Function nodes supporting a network slice. The method includes calculating an average utilization load for a resource for a network slice supported by multiple User Plane Function nodes, identifying an imbalance in utilization of the resource for at least one of the User Plane Function nodes, based on the average utilization load, and in response to identifying the imbalance, controlling the at least one of the User Plane Function nodes to select, based on a predetermined criterion supplied to the at least one of the User Plane Function nodes, a session that supports the network slice and to perform a corrective action with respect to the session.

20 Claims, 8 Drawing Sheets

INFORMATION ELEMENTS IN PFCP REMOVE SESSION REQUEST

| INFORMATION ELEMENTS | CONDITION / COMMENT | APPL. | | | | IE TYPE |
|---|---|---|---|---|---|---|
| | | Sxa | Sxb | Sxc | N4 | |
| NODE ID | THIS IE CONTAINS THE UNIQUE IDENTIFIER OF THE SENDING NODE | X | X | X | X | NODE ID |
| NETWORK SLICE SESSION LOAD REDUCTION LIST | THIS IE INDICATES THE LIST OF S-NSSAI AND SESSION LOAD REDUCTION METRIC | X | X | X | X | NETWORK SLICE SESSION LOAD REDUCTION LIST |

FIG.3

|  | BITS | | | | | | | |
|---|---|---|---|---|---|---|---|---|
| OCTETS | 8 | 7 | 6 | 5 | 4 | 3 | 2 | 1 |
| 1 TO 2 | TYPE = 399 (DECIMAL) ||||||||
| 3 TO 4 | LENGTH = n ||||||||
| 5 | SPARE |||| NUMBER OF S-NSSAIs = m ||||
| 6 TO (j+5) | FIRST NETWORK SLICE SESSION LOAD REDUCTION METRIC ||||||||
| (j+6) TO (k+7) | SECOND NETWORK SLICE SESSION LOAD REDUCTION METRIC ||||||||
| ... | ... ||||||||
| q TO l | m-th NETWORK SLICE SESSION LOAD REDUCTION METRIC ||||||||
| (l+1) TO (n+4) | THESE OCTET(s) IS/ARE PRESENT ONLY IF EXPLICITLY SPECIFIED ||||||||

FIG.4

| OCTETS | BITS | | | | | | | |
|---|---|---|---|---|---|---|---|---|
| | 8 | 7 | 6 | 5 | 4 | 3 | 2 | 1 |
| 1 TO 2 | TYPE = 400 (DECIMAL) | | | | | | | |
| 3 TO 4 | LENGTH = n | | | | | | | |
| 5 TO 13 | S-NSSAI | | | | | | | |
| 14 TO 15 | SESSION LOAD REDUCTION METRIC | | | | | | | |
| 15 TO 16 | SESSION SELECTION CRITERIA | | | | | | | |
| 16 TO (n+4) | THESE OCTET(s) IS/ARE PRESENT ONLY IF EXPLICITLY SPECIFIED | | | | | | | |

DYNAMIC SESSION REBALANCING ACROSS USER PLANE FUNCTION NODES

TECHNICAL FIELD

The present disclosure relates to network operations and, more specifically, to dynamically rebalancing sessions across User Plane Function (UPF) nodes.

BACKGROUND

In both Enterprise and Service Provider networks, the concept of network slicing plays a pivotal role in catering to specific service types while adhering to agreed-upon Service-Level Agreements (SLAs). To enhance user experience and achieve desirable latency, service providers may strategically deploy User Plane Function (UPF) nodes at the network edge. In such deployments, a single UPF node may serve multiple network slices.

Despite the load-balanced selection of edge-deployed UPF nodes based on the network slice to which devices belong, the unpredictable nature of device connections and disconnections within the network poses a challenge. If a particular UPF node experiences a higher number of device disconnections, an imbalance of sessions belonging to different network slices may result on the UPF nodes. This issue becomes more pronounced when multiple Service Management Functions (SMFs) are connected to the same UPF.

The consequences of this imbalance include skewed session balance, throughput, and IP-chunk utilization across UPF nodes, leading to some nodes being underutilized while others are overutilized. This, in turn, may result in a degradation of Key Performance Indicators (KPIs) and an adverse impact on the overall user experience. Furthermore, this scenario can cause a given UPF's per-slice usage to deviate from its expected capacity projection, possibly resulting in increased operational, maintenance, and serviceability costs for the network operator.

DETAILED DESCRIPTION

Overview

A method is provided to address imbalance across User Plane Function nodes supporting a network slice. The method includes calculating an average utilization load for a resource for a network slice supported by multiple User Plane Function nodes, identifying an imbalance in utilization of the resource for at least one of the User Plane Function nodes, based on the average utilization load, and in response to identifying the imbalance, controlling the at least one of the User Plane Function nodes to select, based on a predetermined criterion supplied to the at least one of the User Plane Function nodes, a session that supports the network slice and to perform a corrective action with respect to the session.

In another embodiment, a device is provided. The device includes an interface configured to enable network communications, a memory, and one or more processors coupled to the interface and the memory, and configured to calculate an average utilization load for a resource for a network slice supported by multiple User Plane Function nodes, identify an imbalance in utilization of the resource for at least one of the User Plane Function nodes, based on the average utilization load, and in response to identifying the imbalance, control the at least one of the User Plane Function nodes to select, based on a predetermined criterion supplied to the at least one of the User Plane Function nodes, a session that supports the network slice and to perform a corrective action with respect to the session.

Example Embodiments

Figure 1:
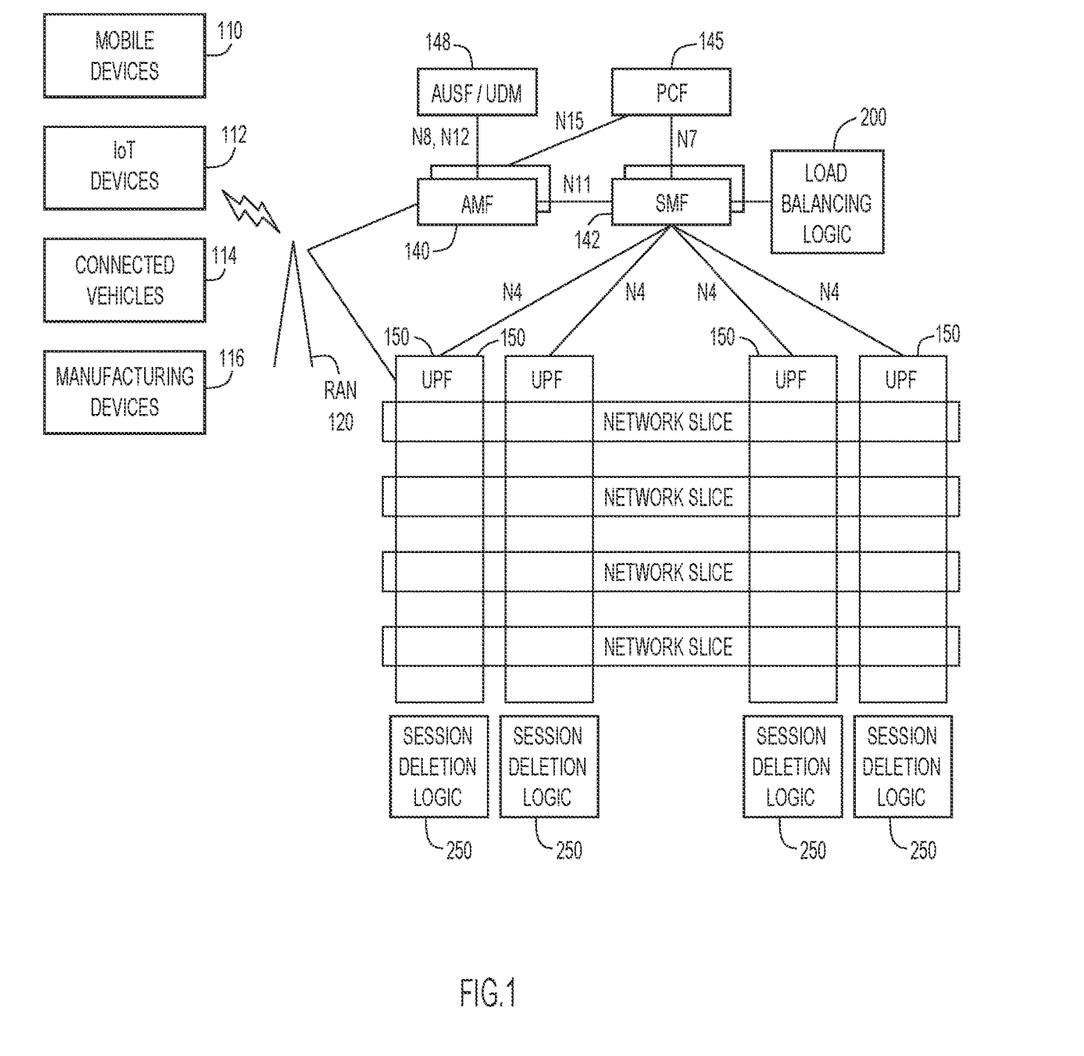
FIG. 1 depicts wireless devices that may communicate with a core network that hosts load balancing logic and session deletion logic, according to an example embodiment.

FIG. 1 depicts wireless devices, such as mobile devices 110, Internet of Things (IoT) devices 112, connected vehicles 114, and manufacturing devices 116 that may communicate with a core network 100 via a radio access network (RAN) 120. Core network 100 includes several components as described below.

An Access and Mobility Management Function (AMF) 140 may be configured to support termination of non-access stratum (NAS) signaling, NAS ciphering & integrity protection, registration management, connection management, mobility management, access authentication and authorization, security context management. As indicated, multiple AMF nodes may be deployed.

A Session Management Function (SMF) 142 may be configured to support session management (e.g., session establishment, modification, release), user equipment (UE) Internet Protocol (IP) address allocation & management, Dynamic Host Configuration protocol (DHCP) functions, termination of NAS signaling related to session management, downlink (DL) data notification, and traffic steering configuration for a User Plane Function (UPF) 150 node for proper traffic routing. As indicated, multiple SMF nodes may be deployed. In one embodiment, SMF 142 may host load balancing logic 200, the function of which is described further below.

UPF 150 may be configured to support packet routing & forwarding, packet inspection, QoS handling, acts as external PDU session point of interconnect to Data Network (not shown), and may be an anchor point for intra-& inter-radio access technology (RAT) mobility. Multiple UPFs 150 may deployed, as shown, and the UPFs 150, as previously noted, may be deployed at a network edge. Each UPF 150 may host or have access to session deletion logic 250, the function of which is described further below.

A Policy Control Function (PCF) 145 may be configured to support a unified policy framework, and provides policy rules to control plane functions, and access subscription information for policy decisions in user data repository (UDR).

A combined Authentication Server Function (AUSF) and Unified Data Management (UDM) 148 may be configured to function as an authentication server and may support generation of Authentication and Key Agreement (AKA) credentials, user identification handling, access authorization, subscription management.

Those skilled in the art will appreciate that still other nodes and functionality may also be provided in core network 100.

The components described in FIG. 1 may communicate with each other over predetermined interfaces such as N4, N7, N8, N11, N15, as shown. Other interfaces may be used when additional components are added to core network 100. It is noted that interface N4 corresponds to the Sx interface in a Control and User Plane separation (CUPS) architecture, if core network 100 is so configured.

Still with reference to FIG. 1, any given network slice might use the resources of any number of UPFs 150. Or, stated differently, different sessions may be established for a given network slice on any one or more of the UPFs 150. However, as noted previously, resource utilization among the UPFs 150 may become imbalanced over time. Load balancing logic 200 and session deletion logic 250, operating, respectively, on or with SMF 142 and UPF 150, are configured to address this potential session imbalance by selectively causing sessions to be deleted from one or more UPFs 150. Those session may be subsequently reestablished on one or more different UPFs 150.

To achieve this capability, the following methodology is implemented.

Load balancing logic 200 is configured to periodically calculate an average sessions/throughput/IP-chunk utilization load KPI on a network slice basis across UPFs 150. The periodic sampling interval may be configurable within load balancing logic 200.

Load balancing logic 200 is then configured to identify any imbalance in resource utilization at any UPF 150 for a network slice, by comparing against the calculated average.

If this imbalance is more than the configured threshold for, e.g., a predetermined number of periods, load balancing logic 200 is configured to enforce corrective action towards a given UPF 150. Corrective action may include a request for the given UPF 150 to reduce a predetermined number of sessions for one or more network slices, to achieve the calculated average distribution. Such corrective action might be executed only after a predetermined number of successive samples are beyond the configured threshold. The number of such successive samples may be configurable.

In an embodiment, load balancing logic 200 also provides to the given UPF 150 at least one of a metric (e.g., reduce number of sessions by 30%) and criteria by which to identify sessions which are to be released or deleted.

When session deletion logic 250, which is in communication with or hosted by UPF 150, receives a message to reduce sessions along with (the metric and) criteria, session deletion logic 250 is configured to identify sessions consistent with the criteria and gracefully delete them.

After receiving an indication from UPF 150 or session deletion logic 250 that deletion is occurring or has occurred, load balancing logic 200 is configured to initiate a graceful session delete procedure on other interfaces.

When the deleted sessions attach again, SMF 142 may distribute them evenly using any known method, including round robin, or some other method that monitors operations of UPFs 150 and executes a more dynamic approach to session re-establishment.

The following is an example of how load balancing logic 200 and session deletion logic 250 may operate in accordance with one possible embodiment.

KPI to Monitor: Session Count
Configured Threshold: 10% (configurable by load balancing logic 200)
Sampling Interval: 5 mins (configurable by load balancing logic 200)
Number of continuous samples to monitor to initiate corrective action: 6 (configurable by load balancing logic 200)
Average distribution of sessions for Network Slice 1 across a UPF: 5000

The table below shows session count for multiple UPFs 150 on a network slice basis at different sampling time intervals.

| Sample No./UPF | UPF1 | UPF2 | UPF3 | UPF4 |
|---|---|---|---|---|
| 1 | 4000 | 5200 | 6600 | 4200 |
| 2 | 4200 | 5300 | 6500 | 4000 |
| 3 | 4100 | 5200 | 6600 | 4100 |
| 4 | 4150 | 5000 | 6800 | 4150 |
| 5 | 4000 | 5300 | 6700 | 4200 |
| 6 | 4000 | 5200 | 6750 | 4050 |

In the example above, UPF3 exceeds the configured thresholds for six consecutive samples, which is the specified number of samples to trigger corrective action. The sessions for a particular network slice are clearly imbalanced, which could potentially impact the desired SLA. Therefore, load balancing logic 200 is configured to redistribute sessions from UPF3 to other UPFs in order to restore balance.

Figure 2:
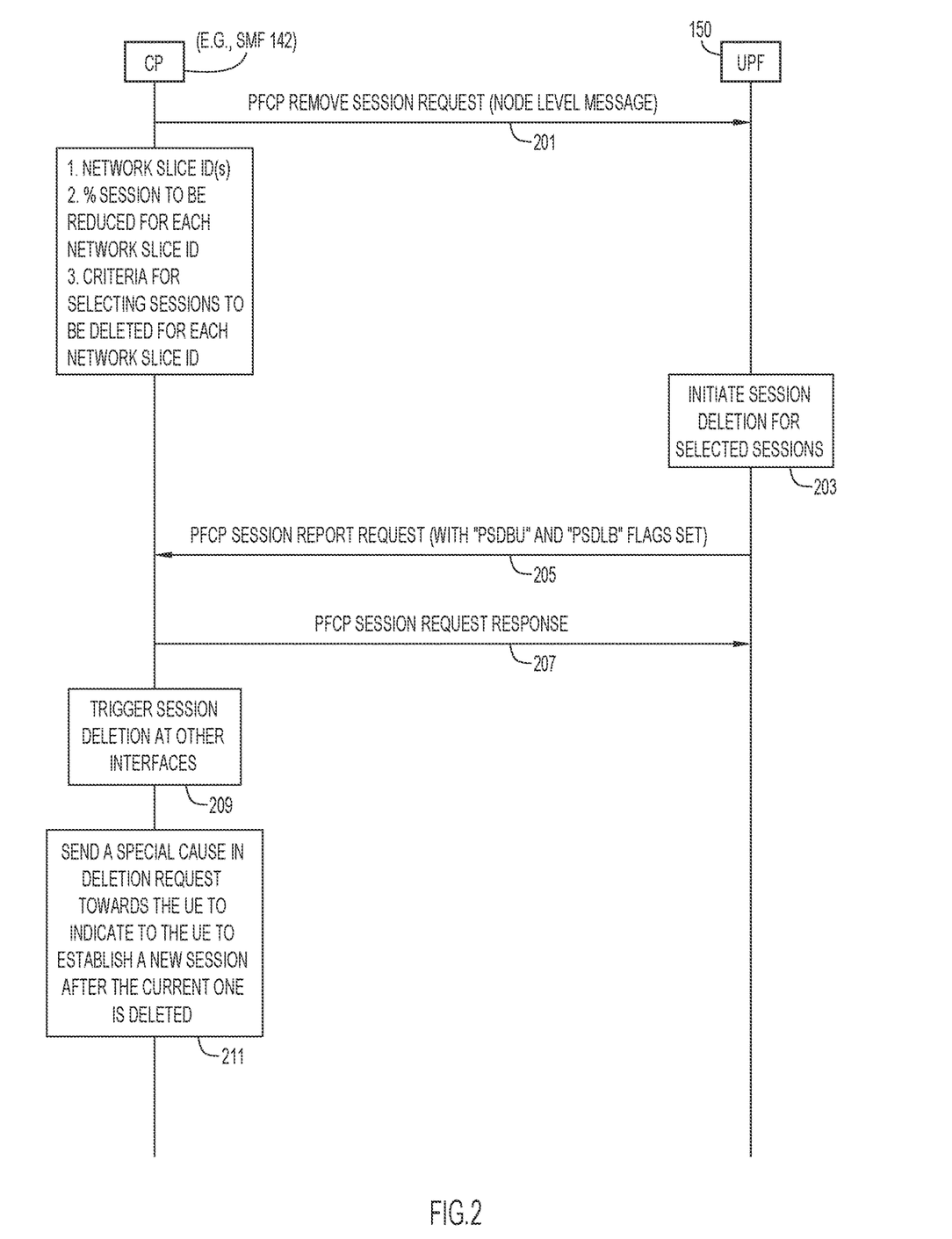
FIG. 2 is a ladder diagram showing a series of operations performed by load balancing logic and session deletion logic, according to an example embodiment.

FIG. 2 is a ladder diagram showing a series of operations that may be performed by load balancing logic 200 and session deletion logic 250, according to an example embodiment. The messages exchanged in FIG. 2 are shown as Packet Forwarding Control Protocol (PFCP) messages. However, other types of messages could also be employed to achieve similar functionality.

At 201, a control plane (CP) (e.g., SMF 142), in coordination with load balancing logic 200 sends a node level message "PFCP Remove Session Request" to UPF 150/session deletion logic 250 to initiate corrective action of reducing sessions on that UPF 150. This PFCP message may include a new information element (IE) "Network Slice Session Load Reduction List," which may include, e.g.,
one or more Single Network Slice Selection Assistance Information (S-NSSAIs) (which uniquely identifies a network slice)
% sessions the UPF 150 is expected to reduce for each of those S-NSSAIs (e.g., a metric)
the criteria that UPF 150 should use to select the sessions for removal.

The selection criteria may include, but are not limited to:
Least data active sessions
High throughput sessions In response to receiving the "PFCP Remove Session Request" message, UPF 150 or session deletion logic 250 is configured to select the session(s) to be deleted. More specifically, based on the criteria received and the metric (e.g., 20%), session deletion logic 250 may identify the sessions to be deleted for the S-NSSAI(s). It is noted that UPF 150 is already aware of the S-NSSAI of each session as that information is sent to UPF 150 by the CP (e.g., SMF 142) in a prior PFCP Session Establishment Request message (not shown).

After session deletion logic 250 has identified the sessions to be deleted, UPF 150 may initiate, at 203, a PFCP Session Release as specified in 3GPP specification 29.244, section 5.18.2. Thereafter, at 205, UPF 150 may initiate a respective PFCP Session Report Request message for each of the sessions, along with a PFCP Session Deleted By UPF (PSDBU) flag set to "1" to indicate to the CP function (SMF 142) that the session is being deleted in/by UPF 150. Also, a new flag, "PFCP Session Deleted for Load Balancing (PSDLB)," may be added to "PFCPSRReq-Flags" and is set in the PFCP Session Report Request message, at 205, to indicate that the given session is being deleted in response to the "PFCP Remove Session Request" message.

Once CP/SMF 142 receives the PFCP Session Report Request, with PSDBU flag set to "1", it may initiate deletion of the PFCP Session, as indicated at 209. Also, if the PSDLB flag is set to "1", CP/SMF 142 may send, at 211, a cause (e.g., Reactivation requested for LTE 4G sessions) in the deletion request towards the UE (e.g., one the mobile devices 110, Internet of Things (IoT) devices 112, connected vehicles 114, and manufacturing devices 116), which will indicate to the UE to establish a new session after the current one is deleted.

At 207, CP/SMF 142 may send a PFCP Session Report response message back to UPF 150, in response to the PFCP Session Report request message sent at 205.

Figure 3:
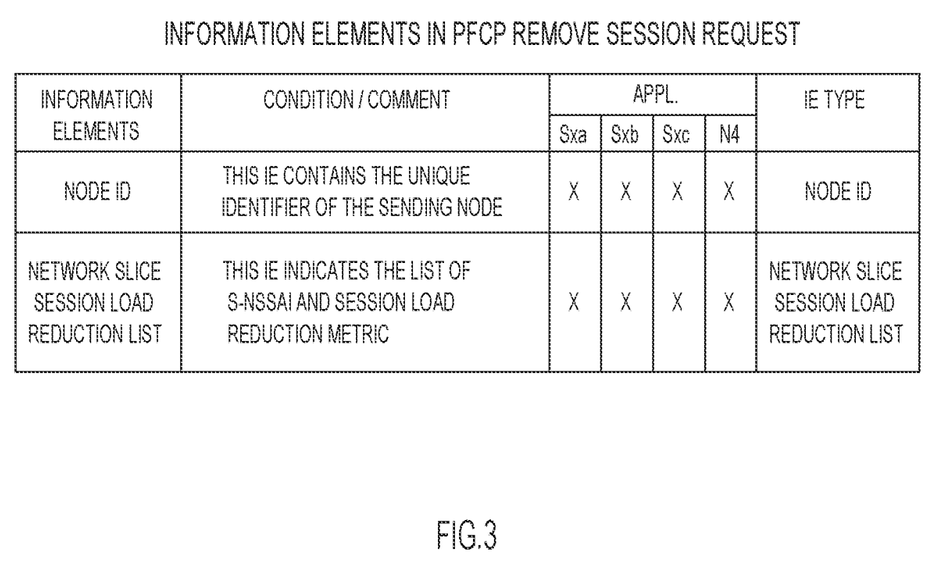
FIG. 3 is a table showing information elements used in a Packet Forwarding Control Protocol (PFCP) Remove Session Request message, according to an example embodiment.

FIG. 3 is a table showing information elements used in a PFCP Remove Session Request message, according to an example embodiment. As indicated, the PFCP Remove Session Request message may be sent over the Sxa, Sxb, Sxc, or N4 interfaces by the CP function/SMF 142 to UPF 150/session deletion logic 250 to request removal of sessions to balance session load for different device types across UPF 150 nodes. The PFCP Remove Session Request message may include a unique identifier of the sending node (e.g., SMF 142) and a list of S-NSSAIs and session load reduction metric (e.g., reduce by 20%), upon which UPF 150 may base session removal decisions.

Figure 4:
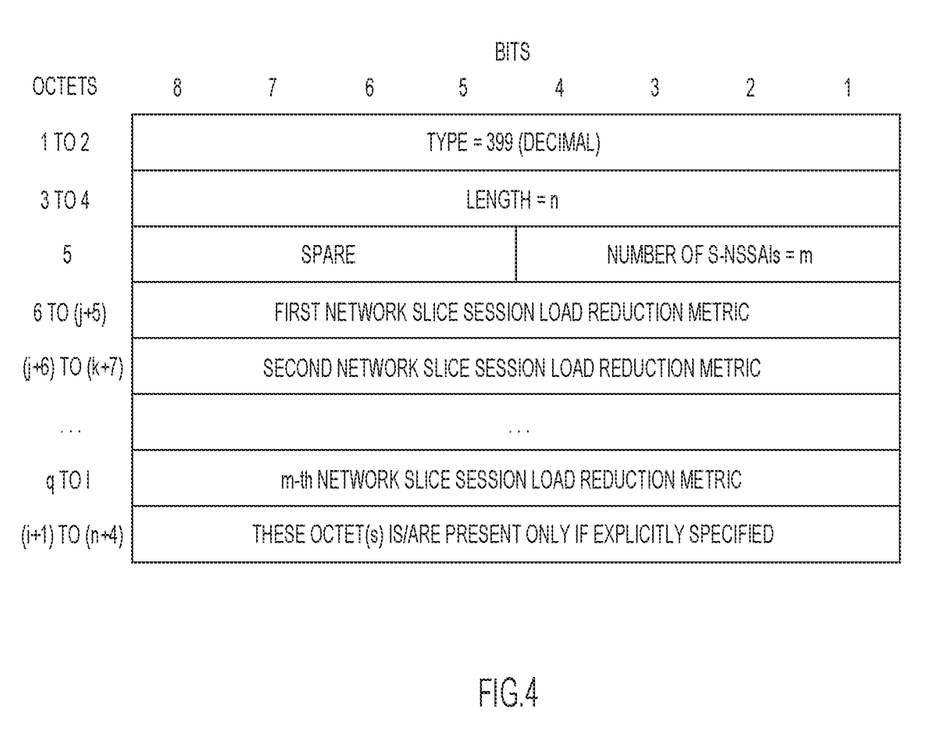
FIG. 4 shows a Network Slice Session Load Reduction List information element (IE), according to an example embodiment.

FIG. 4 shows a Network Slice Session Load Reduction List information element (IE), of a first type 399, according to an example embodiment. As shown, the list contains a session load reduction metric for each S-NSSAI. As mentioned earlier, such a load reduction metric could be, e.g., an indication to reduce by 20% sessions or throughput.

Figure 5:
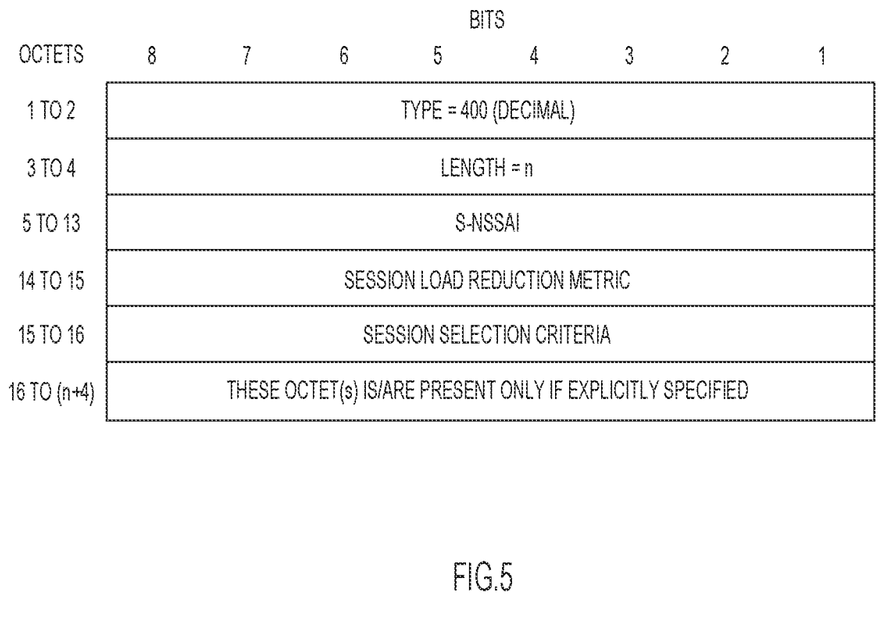
FIG. 5 shows a Network Slice Session Load Reduction Metric IE, according to an example embodiment.

FIG. 5 shows a Network Slice Session Load Reduction Metric IE, of a second type 400, according to an example embodiment. As shown, for each slice (S-NSSAI), a session load reduction metric and the session selection criteria are provided. The selection criteria could be, e.g., an indication of least data active sessions, high throughput sessions, etc.

The enhanced network capability provided by the described embodiments results in improved KPIs by addressing the issue of session imbalance. With more balanced session distribution, network performance metrics may be better aligned with expected standards, likely leading to higher quality service delivery.

The embodiments described herein may enhance the reliability of the network. This may result in fewer service disruptions and a more dependable network infrastructure, ultimately benefiting both operators and users.

The approach described herein may improve utilization of UPF 150 resources. By avoiding overutilization of some UPF 150 nodes and underutilization of others, network resources are used more efficiently. This may lead to cost savings and improved scalability for network operators.

Figure 6:
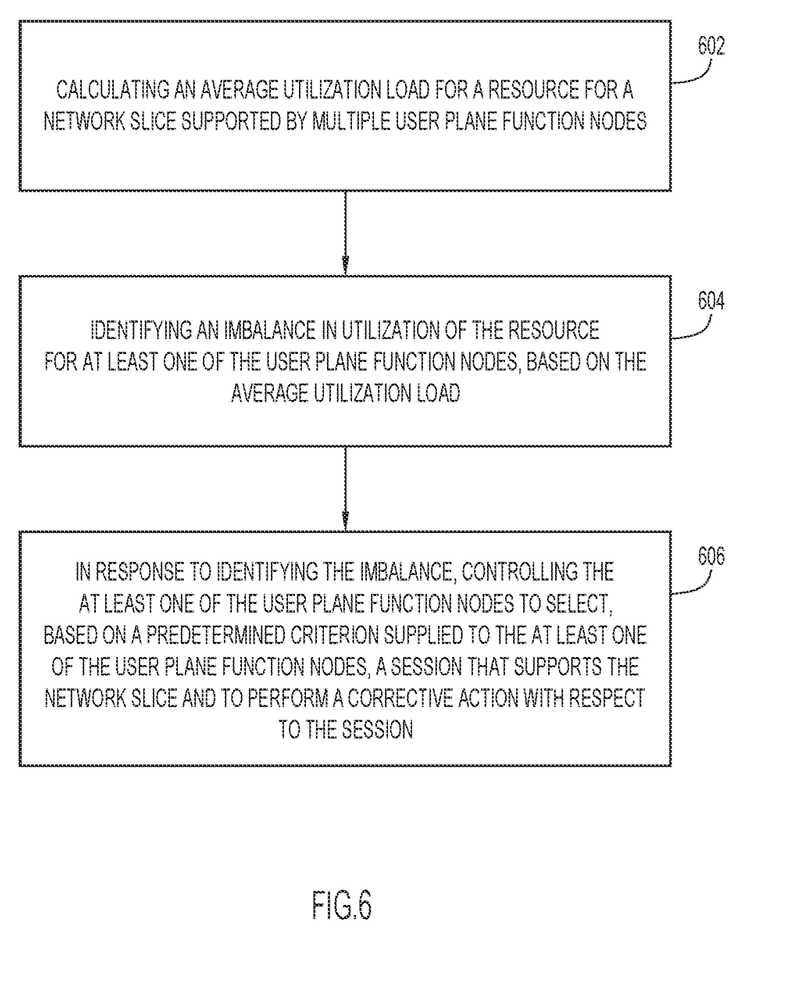
FIG. 6 is a flowchart illustrating a series of operations that may be executed by load balancing logic, according to an example embodiment.

FIG. 6 is a flowchart illustrating a series of operations that may be executed by load balancing logic 200, according to an example embodiment. At 602, an operation includes calculating an average utilization load for a resource for a network slice supported by multiple User Plane Function nodes. At 604, an operation includes identifying an imbalance in utilization of the resource at least one of the User Plane Function nodes, based on the average utilization load. And, at 606, an operation includes in response to identifying the imbalance, controlling the at least one of the User Plane Function nodes to select, based on a predetermined criterion supplied to the at least one of the User Plane Function nodes, a session that supports the network slice and to perform a corrective action with respect to the session.

Figure 7:
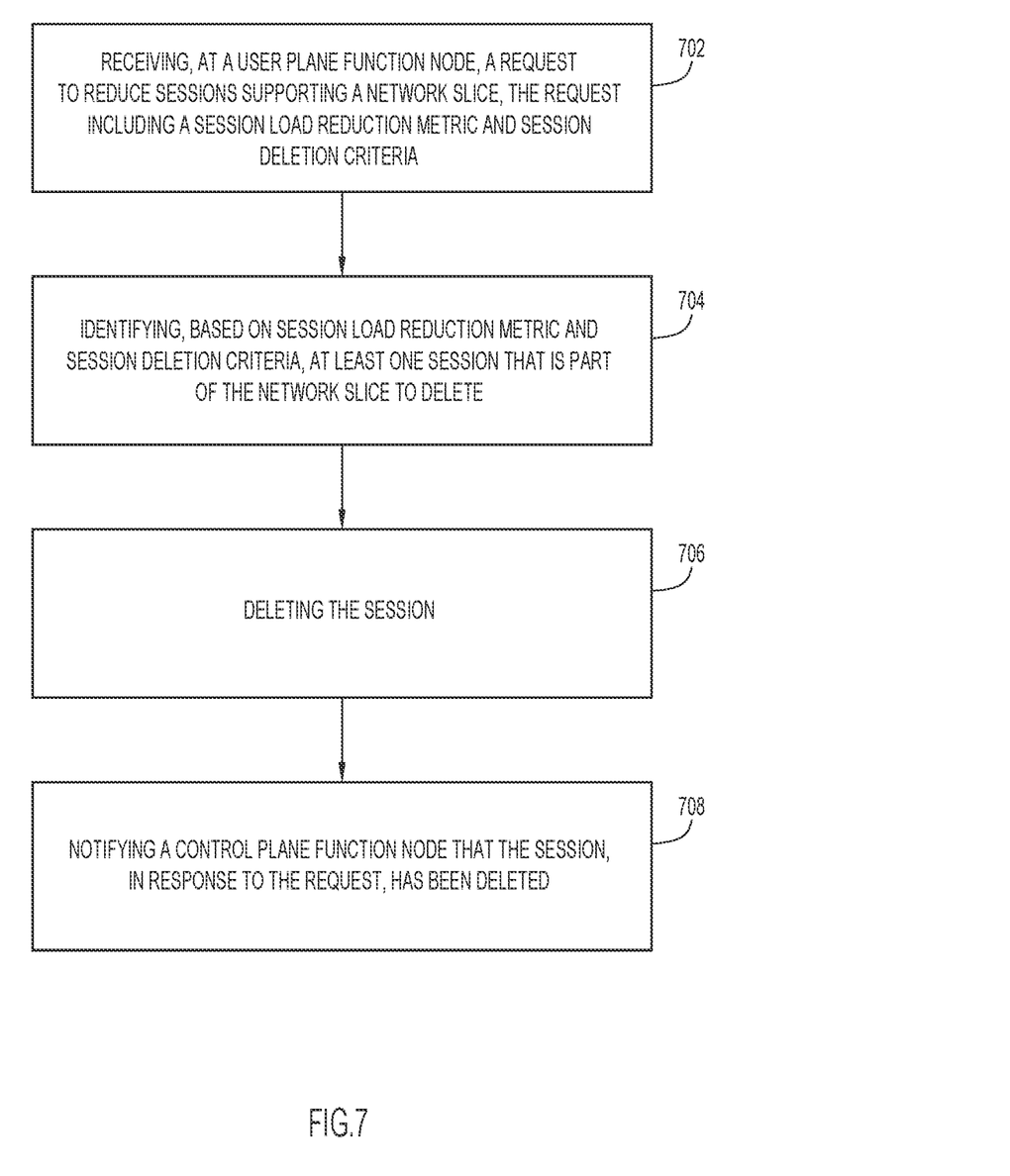
FIG. 7 is flowchart illustrating a series of operations that may be executed by session deletion logic, according to an example embodiment.

FIG. 7 is flowchart illustrating a series of operations that may be executed by session deletion logic 250, according to an example embodiment. At 702, an operation includes receiving, at a User Plane Function node, a request to reduce sessions supporting a network slice, the request including a session load reduction metric and session deletion criteria. At 704, an operation includes identifying, based on session load reduction metric and session deletion criteria, at least one session that is part of the network slice to delete. At 706, an operation includes deleting the session from the User Plane Function node. And, at 708, an operation includes notifying a control plane function node that the session, in response to the request, has been deleted.

Figure 8:
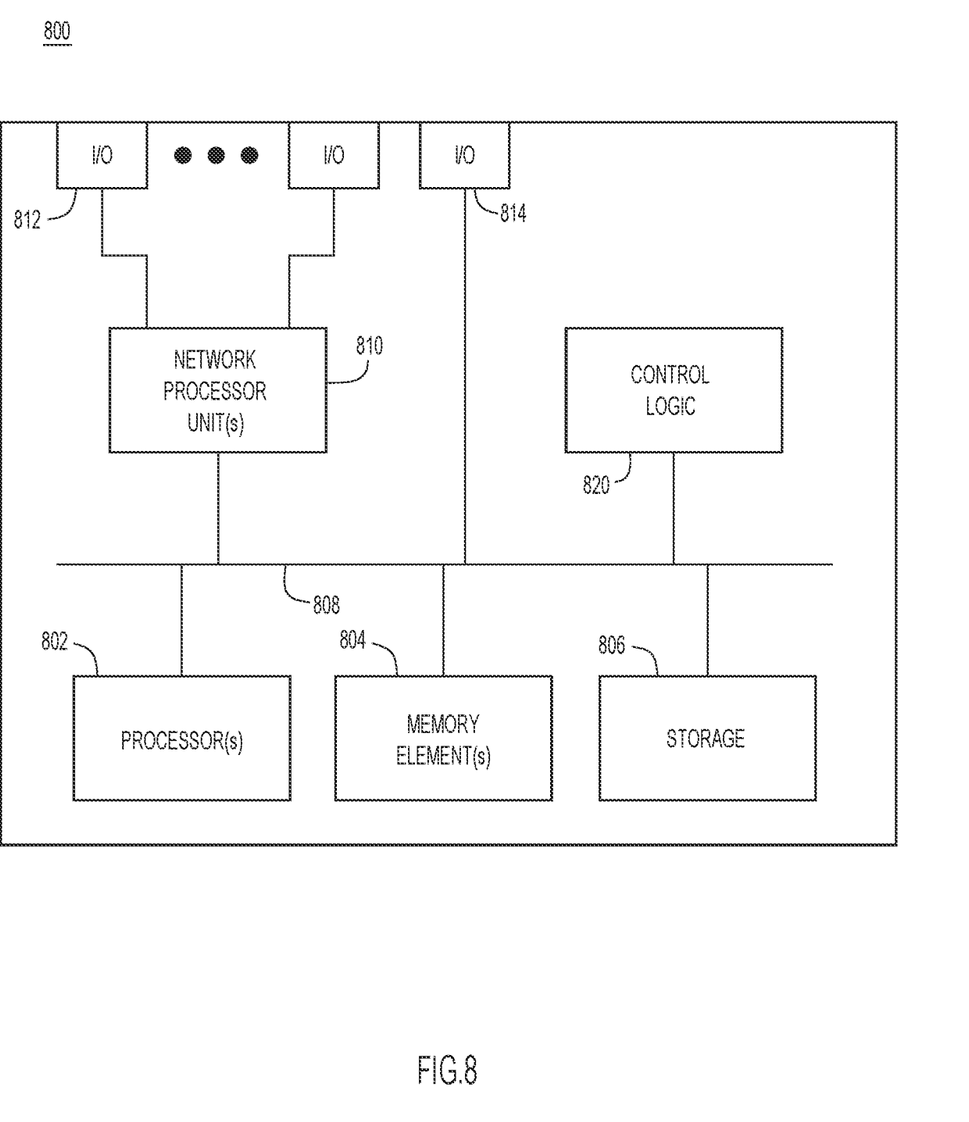
FIG. 8 is a block diagram of a computing device that may be configured to host load balancing logic and session deletion logic, and perform the techniques described herein, according to an example embodiment.

FIG. 8 is a block diagram of a computing device that may be configured to execute load balancing logic 200 or session deletion logic 250 and perform the techniques described herein, according to an example embodiment. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820 (which could include, for example, load balancing logic 200 or session deletion logic 250. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa) or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method may include calculating an average utilization load for a resource for a network slice supported by multiple User Plane Function nodes, identifying an imbalance in utilization of the resource for at least one of the User Plane Function nodes, based on the average utilization load, and in response to identifying the imbalance, controlling the at least one of the User Plane Function nodes to select, based on a predetermined criterion supplied to the at least one of the User Plane Function nodes, a session that supports the network slice and to perform a corrective action with respect to the session.

In the method, the resource may be one of a session, throughput, and Internet Protocol (IP)-chunk.

In the method, the calculating may be performed over a predetermined periodic sampling interval.

In the method, the corrective action may include deleting the session.

In the method, controlling the at least one of the User Plane Function nodes may include sending a request to the at least one of the User Plane Function nodes including a network slice session load reduction list and a load reduction metric.

In the method, the predetermined criterion may include least one of (i) least data active sessions and (ii) high throughput sessions.

In the method, the request may be sent as a Packet Forwarding Control Protocol message.

The method may further include receiving a message from the at least one of the User Plane Function nodes that the session has been deleted in response to the request.

The method may further include triggering deletion of the session at at least one interface.

The method may further include notifying a user equipment to reestablish a new session for the session that has been deleted.

In another embodiment, a device may be provided and may include an interface configured to enable network communications, a memory, and one or more processors coupled to the interface and the memory, and configured to: calculate an average utilization load for a resource for a network slice supported by multiple User Plane Function nodes, identify an imbalance in utilization of the resource for at least one of the User Plane Function nodes, based on the average utilization load, and in response to identifying the imbalance, control the at least one of the User Plane Function nodes to select, based on a predetermined criterion supplied to the at least one of the User Plane Function nodes, a session that supports the network slice and to perform a corrective action with respect to the session.

In the device, the resource may be one of a session, throughput, and Internet Protocol (IP)-chunk.

In the device, the one or more processors may be further configured to calculate over a predetermined periodic sampling interval.

In the device, the predetermined criterion may include at least one of (i) least data active sessions and (ii) high throughput sessions.

In the device, the corrective action may include deleting the session.

In the device, the one or more processors may be further configured to control the at least one of the User Plane Function nodes by sending a request to the at least one of the User Plane Function nodes including a network slice session load reduction list and a load reduction metric.

In the device, the one or more processors may be further configured to receive a message from the at least one of the User Plane Function nodes that the session has been deleted in response to the request.

In yet another embodiment, one or more non-transitory computer readable storage media encoded with instructions are provided and that, when executed by a processor, cause the processor to: calculate an average utilization load for a resource for a network slice supported by multiple User Plane Function nodes, identify an imbalance in utilization of the resource for at least one of the User Plane Function nodes, based on the average utilization load, and in response to identifying the imbalance, control the at least one of the User Plane Function nodes to select, based on a predetermined criterion supplied to the at least one of the User Plane Function nodes, a session that supports the network slice and to perform a corrective action with respect to the session.

The one or more non-transitory computer readable storage media may further include instructions that are configured to control the at least one of the User Plane Function nodes by sending a request to the at least one of the User Plane Function nodes including a network slice session load reduction list and a load reduction metric.

The one or more non-transitory computer readable storage media may include instructions that are configured to receive a message from the at least one of the User Plane Function nodes that the session has been deleted in response to the request.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    calculating an average utilization load for a resource for a network slice supported by User Plane Function nodes to obtain a calculated average utilization load, wherein the User Plane Function nodes are in communication with a mobility core network;
    identifying an imbalance in utilization of the resource for at least one of the User Plane Function nodes, based on the calculated average utilization load; and
    in response to identifying the imbalance, controlling the at least one of the User Plane Function nodes to select, based on a predetermined criterion supplied to the at least one of the User Plane Function nodes, a session that supports the network slice and to perform a corrective action with respect to the session.

2. The method of claim 1, wherein the resource is one of a session, throughput, and Internet Protocol (IP)-chunk.

3. The method of claim 1, wherein the calculating is performed over a predetermined periodic sampling interval.

4. The method of claim 1, wherein the corrective action comprises deleting the session.

5. The method of claim 1, wherein controlling the at least one of the User Plane Function nodes comprises sending a request to the at least one of the User Plane Function nodes including a network slice session load reduction list and a load reduction metric.

6. The method of claim 5, wherein the predetermined criterion comprises at least one of (i) least data active sessions and (ii) high throughput sessions.

7. The method of claim 5, wherein the request is sent as a Packet Forwarding Control Protocol message.

8. The method of claim 5, further comprising receiving a message from the at least one of the User Plane Function nodes that the session has been deleted in response to the request.

9. The method of claim 8, further comprising triggering deletion of the session at at least one interface.

10. The method of claim 8, further comprising notifying a user equipment to reestablish a new session for the session that has been deleted.

11. A device comprising:
an interface configured to enable network communications;
a memory; and
one or more processors coupled to the interface and the memory, and configured to:
calculate an average utilization load for a resource for a network slice supported by User Plane Function nodes to obtain a calculated average utilization load, wherein the User Plane Function nodes are in communication with a mobility core network;
identify an imbalance in utilization of the resource for at least one of the User Plane Function nodes, based on the calculated average utilization load; and
in response to identifying the imbalance, control the at least one of the User Plane Function nodes to select, based on a predetermined criterion supplied to the at least one of the User Plane Function nodes, a session that supports the network slice and to perform a corrective action with respect to the session.

12. The device of claim 11, wherein the resource is one of a session, throughput, and Internet Protocol (IP)-chunk.

13. The device of claim 11, wherein the one or more processors are further configured to calculate over a predetermined periodic sampling interval.

14. The device of claim 11, wherein the predetermined criterion comprises at least one of (i) least data active sessions and (ii) high throughput sessions.

15. The device of claim 11, wherein the corrective action comprises deleting the session.

16. The device of claim 11, wherein the one or more processors are further configured to control the at least one of the User Plane Function nodes by sending a request to the at least one of the User Plane Function nodes including a network slice session load reduction list and a load reduction metric.

17. The device of claim 16, the one or more processors are further configured to receive a message from the at least one of the User Plane Function nodes that the session has been deleted in response to the request.

18. One or more non-transitory computer readable storage media encoded with instructions that, when executed by a processor, cause the processor to:
calculate an average utilization load for a resource for a network slice supported by User Plane Function nodes to obtain a calculated average utilization load, wherein the User Plane Function nodes are in communication with a mobility core network;
identify an imbalance in utilization of the resource for at least one of the User Plane Function nodes, based on the calculated average utilization load; and
in response to identifying the imbalance, control the at least one of the User Plane Function nodes to select, based on a predetermined criterion supplied to the at least one of the User Plane Function nodes, a session that supports the network slice and to perform a corrective action with respect to the session.

19. The one or more non-transitory computer readable storage media of claim 18, wherein the instructions are configured to control the at least one of the User Plane Function nodes by sending a request to the at least one of the User Plane Function nodes including a network slice session load reduction list and a load reduction metric.

20. The one or more non-transitory computer readable storage media of claim 19, wherein the instructions are configured to receive a message from the at least one of the User Plane Function nodes that the session has been deleted in response to the request.

* * * * *